March 24, 1970　　　J. E. PATTERSON　　　3,502,039
CONNECTOR FOR OVERHEAD CONVEYOR CHAIN
Filed Nov. 1, 1967　　　　　　　　　　2 Sheets-Sheet 1

Jacob E. Patterson
INVENTOR.

BY Clarence A. O'Brien
and Harvey B. Jacobson
Attorneys

March 24, 1970  J. E. PATTERSON  3,502,039
CONNECTOR FOR OVERHEAD CONVEYOR CHAIN
Filed Nov. 1, 1967  2 Sheets-Sheet 2
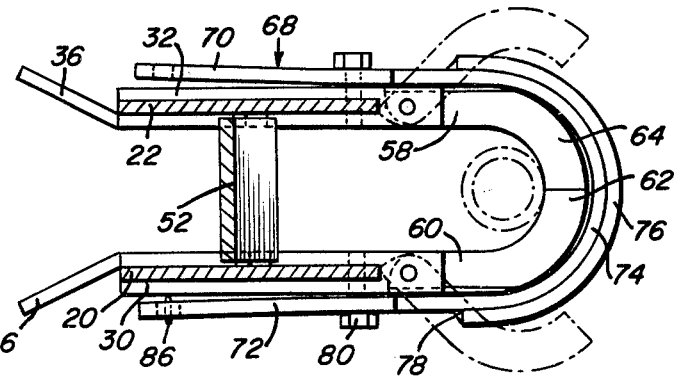
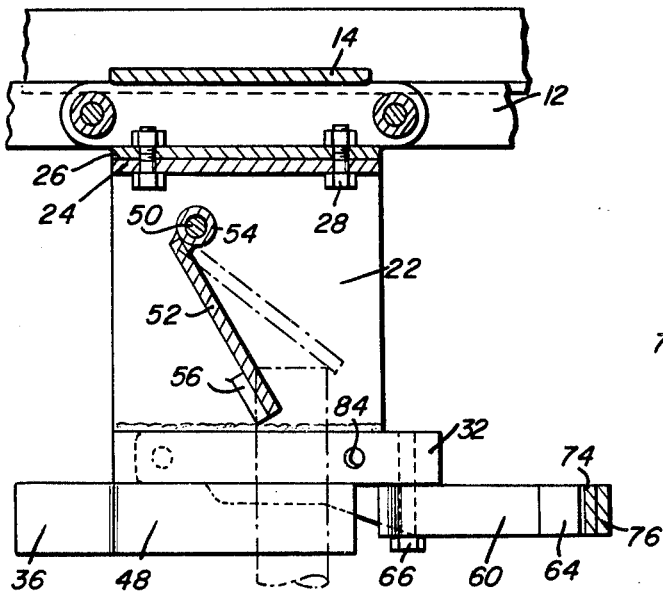
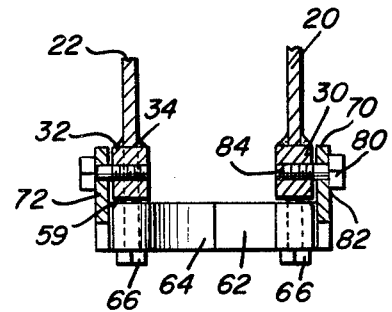
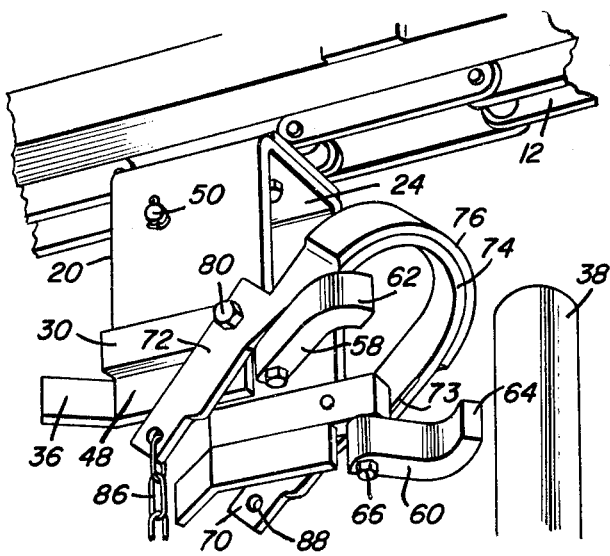
Jacob E. Patterson
INVENTOR.

United States Patent Office 3,502,039
Patented Mar. 24, 1970

3,502,039
CONNECTOR FOR OVERHEAD CONVEYOR CHAIN
Jacob E. Patterson, P.O. Box 796,
Minden, La. 71055
Filed Nov. 1, 1967, Ser. No. 679,682
Int. Cl. B60d 1/00
U.S. Cl. 104—172                                7 Claims

ABSTRACT OF THE DISCLOSURE

A connector attached to an overhead chain for engagement with an upstanding member on a wheeled cart or truck rollingly supported on a floor surface of an industrial plant or the like to move the cart with the overhead chain. The connector includes a forwardly opening guide structure, a jaw-type assembly closing the rear of the connector, a catch retaining the upstanding member in the jaw assembly together with a release mechanism for releasably retaining the jaws of the assembly in closed position but enabling outwardly opening movement of the jaws when moved to the released position.

---

The present invention generally relates to conveying systems and more particularly to an attachment for an overhead chain conveyor by which the chain may be connected to a rigid upstanding member such as a pipe attached to a cart, truck or similar type of mobile vehicle, in which the vehicle rolls along the floor surface of an industrial plant or the like.

An object of the present invention is to provide a connector in accordance with the preceding paragraph having a forwardly opening guide assembly which will receive the upper end of the upstanding pipe on the cart, a one-way catch mechanism which enables entry of the upper end of the pipe into the connector but prevents exist of the pipe from the forward end thereof after the pipe has passed the catch together with a releasable jaw assembly at the trailing end of the connector for engaging the upper end of the pipe and moving the cart in the same direction as the chain and at the same speed and in the same path.

A further object of the present invention is to provide a connector in accordance with the preceding object in which the jaw assembly includes a pair of jaw elements pivotally supported for swinging movement from a closed position to an open position about substantially verical axes and a generally U-shaped retaining member which engages the outer surfaces of the jaws to retain them in closed position and being swingable to a position extending upwardly of the jaws forwardly of the pivotal axes thereof whereby the jaws may then swing outwardly to their open position.

Still another object of the present invention is to provide a connector in accordance with the preceding objects in which the retaining member is pivotally supported for movement about substantially a horizontal axis with the end thereof engaging the jaws being weighted so that the force of gravity will return the jaws to their closed position and return the retaining member to position for retaining the jaws in closed position.

A still further object of the present invention is to provide a connector for connecting a cart or other similar vehicle to an overhead conveyor chain which is simple in construction, easy to use, effective for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a longitudinal, plan sectional view taken substantially upon a plane passing along section line 4—4 of FIGURE 2 illustrating the specific structure of the retaining member and jaws as well as the guide members;

FIGURE 5 is a longitudinal, vertical sectional view taken substantially along the center line of the connector illustrating the catch mechanism and the association thereof with the pipe as it moves through the catch mechanism;

Figure 1:
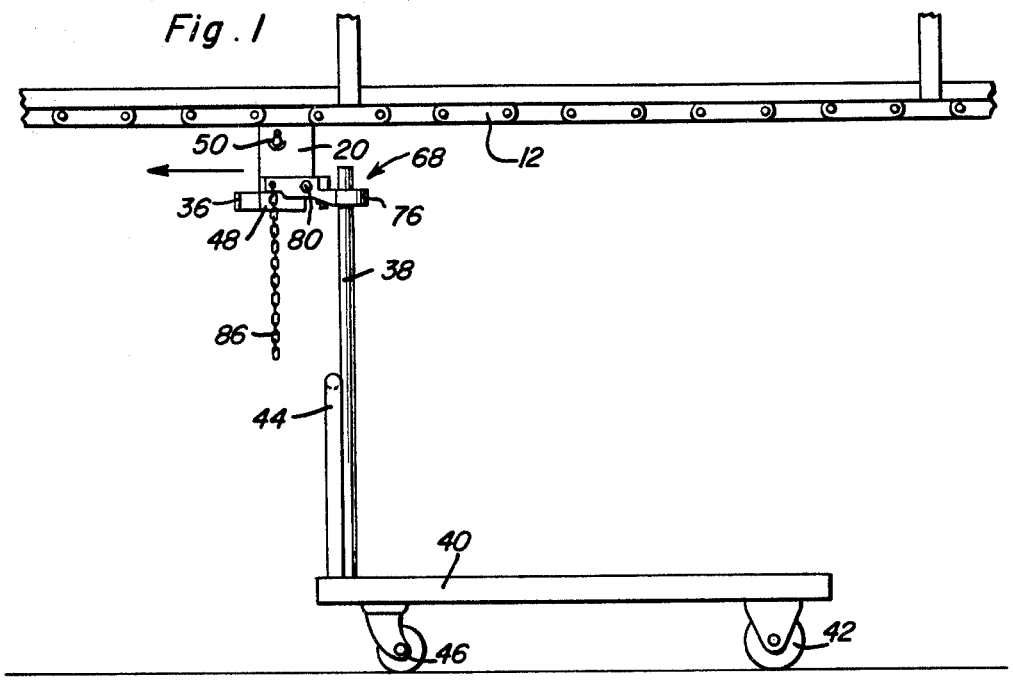
FIGURE 1 is a schematic side elevational view illustrating the orientation of the connector of the present invention associated with an overhead conveyor chain and upstanding pipe on a floor supported cart.
Figure 2:
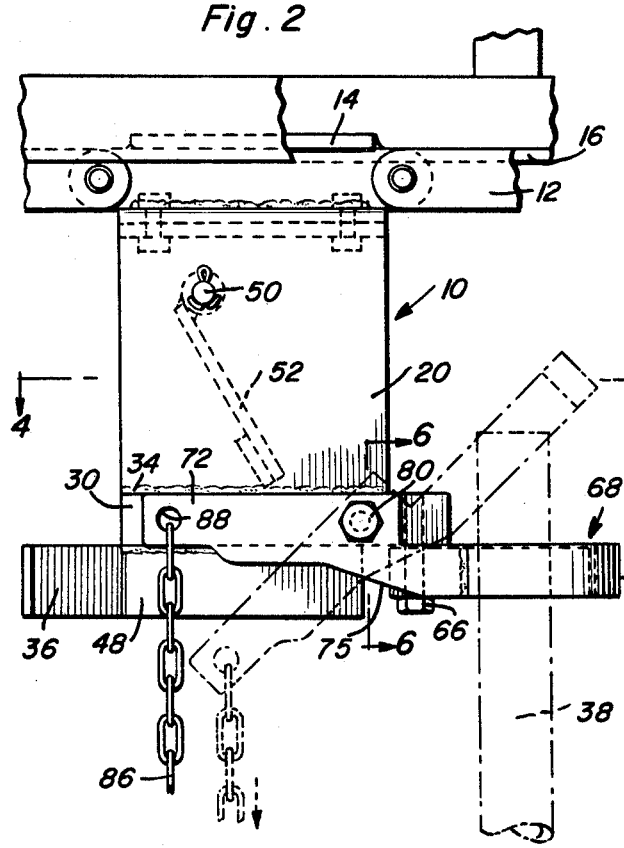
FIGURE 2 is a side elevational view of the connector and overhead conveyor chain with portions broken away illustrating the retaining member in its retaining position and in its released position in dotted line.

FIGURE 6 is a detailed sectional view taken substantially upon a plane passing along section line 6—6 of FIGURE 2 illustrating the horizontal pivotal axis of the retaining member and also the vertical pivotal axes of the jaw members; and FIGURE 7 is an exploded group perspective view of the connector illustrating the connector in released position with the pipe just being released from the connector.

Referring now specifically to the drawings, the numeral 10 generally designates the connector of the present invention which is associated with a conventional overhead conveying chain 12 that is conventionally provided with a top supporting plate 14 on certain links thereof slidable on inwardly extending support flanges 16 to prevent excessive sag of the conveyor chain 12. Such structure is conventional insofar as the conveyor chain is concerned and forms no particular part of the present invention. The connector 10 includes a supporting bracket generally designated by the numeral 18 and which includes substantially parallel legs or plates 20 and 22 interconnected by a top web or plate 24 that is secured to a corresponding bottom plate 26 on certain links of the conveyor chain 12 by suitable fastening bolts 28 or the like thus rigidly securing the inverted U-shaped bracket 18 to the conveyor chain 12 for movement therewith.

Figure 3:
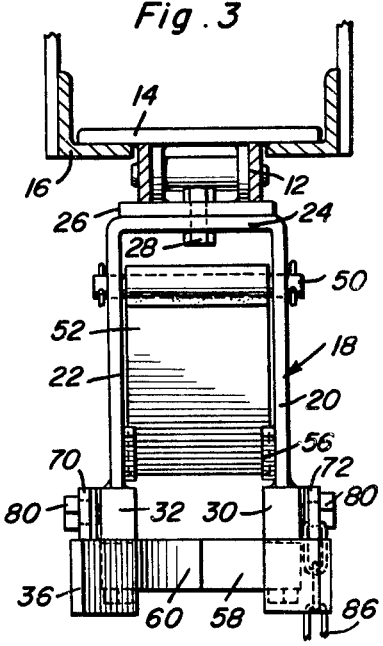
FIGURE 3 is an end view of the connector as observed from the forward end thereof.

At the lower end of the legs 20 and 22, there is provided a pair of longitudinally extending bars 30 and 32 secured rigidly thereto as by welding 34 or the like. At the forward or leading edge of the bracket 18, the bars 30 and 32 each have a longitudinally extending tongue 36 which is angulated outwardly thus forming forwardly diverging guides to define a throat to receive the upper end of a rigid upstanding member such as a pipe 38 fixed rigidly to a cart 40 which is provided with supporting wheels 42 and is of a conventional construction. Generally, the cart 40 will have a handle structure 44 upstanding therefrom and the front wheels 46 will be caster wheels to enable guiding control of the cart 40. The diameter of the pipe 38 is, of course, less than the distance between the bars 30 and 32 with the outwardly diverging or flared guides or tongues 36 serving to guide the upper end of the pipe 38 into the throat area defined between the bars 30 and 32 and thus between the legs or plates 20 and 22. The tongues or guides 36 may be a portion of the bars 30 and 32 or in the preferred construction, the tongues 36 may be integral with a bar 48 which depends below the bars 30 and 32 and is flush with the inner surface thereof as illustrated in FIG. 3. Thus, with the upstanding pipe 38 disposed in a position for engagement with the forwardly diverging tongues or guides 36, the upper end of the pipe 38 will be guided into the connector 10 or it will be retained in a manner described hereinafter.

Disposed between the legs or plates 20 and 22 is a supporting shaft 50 for a catch or latch plate 52 that is welded tangentially to a sleeve 54 rotatably supported on the shaft 50 and which is freely swingable about the axis of the shaft 50. Inwardly extending lugs 56 are provided on the inner surface of the legs or plates 20 and 22 to engage the undersurface of the side edges of the catch or latch plate 52 to limit the downward swinging movement thereof in one direction. As the upper end of the pipe 38 strikes the downwardly and rearwardly inclined leading surface of the catch or latch plate 52, it will be pivoted rearwardly until the upper end of the pipe 38 passes below the lower edge of the rearwardly swung latch plate 52 after which the latch plate 52 will drop down against the stop lugs 56 thereby preventing disconnection of the pipe 38 from the connector 10 by forward movement of the pipe 38 in relation thereto thus precluding disconnection of the cart 40 even though it may move forwardly at a speed greater than the conveyor chain 12 for any reason thereby providing positive connection and control for the cart 40.

Attached to the rear and lower surface of the bars 30 and 32 is a pair of jaws 58 and 60 which have arcuately and inwardly curve terminal ends 62 and 64 respectively. The inturned ends 62 and 64 are the trailing ends of the jaw members 58 and 60 and the forward or leading ends thereof are rounded and are generally disposed in alignment with the rear edges of the tongue mounting plates 48. Pivotally supporting the jaw members 58 and 60 about horizontally aligned vertical axes is a pair of pivot bolts 66 which extend upwardly through apertures provided therefor in the forward ends of the jaws 58 and 60 and are threaded into the trailing ends of the bars 30 and 32. Thus, the jaws 58 and 60 may swing from the closed position illustrated in FIGURE 4 to the open position illustrated in FIGURE 7 about the transversely aligned and spaced vertical axes defined by the pivot bolts 66.

For releasably retaining the jaws 58 and 60 in the closed position and permitting them to move to the open position is a retaining member generally designated by numeral 68 which is generally a U-shaped member provided with a pair of spaced substantially parallel legs 70 and 72 interconnected by an arcuately curved web or bight portion 74 which conforms in curvature to the outer surface of the jaws 58 and 60 when they are in closed position as illustrated in FIG. 4. Attached to the outer surface of the curved bight portion 74 is a correspondingly curved weight 76 in the form of a bar or the like secured to the bight portion 74 as by welding 78 or the like.

The retaining member 68 is pivotally supported from the bars 30 and 32 by horizontally aligned pivot bolts 80 which extend through apertures 82 in the legs 70 and 72 and which are threaded into threaded bores or holes 84 in the bars 30 and 32 respectively thus enabling pivotal movement of the U-shaped retaining member from the horizontal position in alignment with and in encircling engagement with the outer surface of the jaws 58 and 60 to the upwardly inclined position where the bight portion 74 is elevated above the jaws 58 and 60 and above the upper end of the pipe 38 so that the force exerted on the pipe 38 by the jaws 58 and 60 will cause the jaws 58 and 60 to swing open as illustrated in FIG. 7 thus releasing the upper end of the pipe 38 from the connector 10 so that the connector 10 may continue to move with the conveyor chain while the cart 40 with the pipe 38 thereon may stop and be moved manually or in any other suitable manner to a desired position.

As illustrated, the forward end of the leg 72 is provided with a pull chain 86 attached to an aperture 88 therein. A similar aperture 88 is provided in the opposite leg for connecting a pull chain or other suitable pull device onto either or both of the legs 70 and 72 as desired. Thus, the device may be manually operated by manually pulling the pull chain 86 or other suitable manually operated pull device such as a linkage, rod or other flexible device.

As illustrated in FIG. 2, the bight portion 74 of the retainer 68 is downwardly offset from the legs 70 and 72 and in relation to the pivot bolts 80 so that it will be in alignment with the jaws 58 and 60 when in its retaining position. The juncture between the bight portion 74 and the legs 70 and 72 is inclined as at 75 to provide a camming engagement with the top edge of the jaws 58 and 60 when they are in their open position to move the jaws 58 and 60 toward their closed position due to the downward force exerted by the weight 76 and the inherent weight of the portion of the retainer which overbalances the portion thereof forward of the pivot bolts 80. Thus, as the inclined lower edge 75 of the juncture portion between the bight portion 74 and the legs 70 and 72 engage the outwardly extending top edges of the jaws 58 and 60, the jaws 58 and 60 will be effectively cammed toward their closed position.

While the retaining device has been illustrated and described as being manually actuated, it will readily be apparent that the retainer lends itself to automatic operation such as by contact with a suitable switch mechanism operating an electric circuit for moving the retaining member 68 to its released position and subsequently releasing the retaining member 68 to return to its retaining position. Another mode of operating the retaining member 68 may be a photo-electric cell assembly which may be occluded by the passage of a connector 10 to operate an electrical circuit for first pivoting the retaining member to its released position and then permitting it to return to its retaining position after the pipe member 38 has been disengaged from the jaw members 58 and 60. The positive retaining of the pipe 38 in relation to the connector 10 is quite important where it is necessary to maintain control of movement of the cart 40 at all times. For example, the type of cart illustrated is employed in munition plants for carrying shells to various stations in the manufacturing process thereof and it is absolutely imperative to retain the cart 40 under control at all times which is accomplished effectively by the present invention inasmuch as the pipe 38 cannot become disengaged from the connector 10 once it has been associated therewith except by manually or automatically moving the retaining member 68 to its released position. The upper edges of jaws 58 and 60 are preferably chamfered as at 59 (FIG. 6) along the outer corners thereof to cooperate with the chamfered lower inner edge 73 on the legs 70 and 72 to facilitate the camming engagement of the retainer member 68 with the jaws 58 and 60.

The foregoing is considered as illustrative only of the principles of the invention. Further, since numerous modifications and changes will readily occur to those skilled in the art, it is not desired to limit the invention to the exact construction and operation shown and described, and according all suitable modifications and equivalents may be resorted to.

What is claimed as new is as follows:

1. A connector for connecting a load member to an overhead moving member to move the load member therewith comprising means on the connector adapted to be attached to the overhead member for movement of the connector therewith, means disposed at the leading end of said connector to guide the load member into the connector, means on the connector to prevent movement of the load member in the direction of travel of the connector from disconnecting the load member therefrom, and means at the trailing end of the connector to engage and retain the load member connected with the connector, said last named means being selectively releasable from engagement with the load member to enable disconnection of the load member from the connector, said means engaging the load member including movable jaw means, and retaining means engaged with the jaw means for retaining the jaw means selectively in engagement with the load member and movable to a released position for enabling movement of the jaw means to a released position to release the load member.

2. The structure as defined in claim 1 wherein said jaw means includes a pair of jaw members, means supporting the jaw members from the connector for pivotal movement about transversely spaced and aligned vertical axes, the trailing ends of the jaw members being inwardly curved with the trailing ends thereof disposed in adjacent relation to define a curved seat for engagement by the load member.

3. The structure as defined in claim 2 wherein said retaining means engaged with the jaw means includes an arcuate weighted member pivotally mounted on the connector for retaining engagement with the exterior surface of the inwardly curved jaw members, means mounting the retaining member on the connector for swinging movement of the weighted portion thereof about substantially a horizontal axis from a position engaged with the exterior surface of the jaw members to retain them in closed position to an elevated position to enable the jaw members to swing outwardly to their open position, the weighted construction of the retaining member serving to return the jaw members to their closed position upon release of the retaining member.

4. The structure as defined in claim 1 wherein said means defining a guide for the leading end of the connector includes outwardly diverging guide tongues at the leading edge of the connector.

5. The structure as defined in claim 1 wherein said means preventing movement of the load member in the direction of travel in relation to the connector includes a pivotal catch member carried by the connector swingable in a manner to permit passage of the load member inwardly of the connector when the load member is stationary and the connector moving in its direction of travel and then pivotal to a position in leading relation to the load member to prevent movement of the load member in that direction.

6. In combination with a member adapted to move in a predetermined path and direction, a connector connected with said member and adapted to connect with a load device to move the load device with said member, said connector comprising a bracket, means at the leading end of said bracket forming guide means for guidingly engaging the load device, means adjacent the guide means enabling one way movement of the load device into the bracket and preventing exit of the load device from the leading end thereof, positive jaw means at the trailing end of the bracket to engage and retain the load device, and movable retaining means mounted on said bracket engaged with said jaw means for positively retaining the jaw means engaged with the load device, said last named means being releasable for release of the load device from the bracket.

7. The combination as defined in claim 6 wherein said member adapted to move in a predetermined path and direction is in the form of an overhead conveyor chain in an industrial plant or the like with the load device being in the form of a wheeled cart having an upstanding rigid member terminating at an elevation adjacent the conveyor chain, said bracket being mounted on the conveyor chain in depending relation thereto with the guide means, the means enabling one-way movement, the positive jaw means and movable retaining means being mounted for engagement with the terminal upper end of the upstanding member on the cart, said jaw means including a pair of jaw members, means supporting the jaw members from the bracket for pivotal movement about transversely spaced and aligned vertical axes, the trailing ends of the jaw members being inwardly curved to form a seat for engaging the upper end of the upstanding member on the cart, said retaining means including a generally U-shaped member pivotally mounted on the bracket for pivotal movement about a transverse axis with the web portion of the U-shaped member engaging the exterior surface of said jaw members and retaining the jaw members in closed position for forming a seat for the upper end of the upstanding member on the cart, and means engaged with said pivotal retaining member to pivot it upwardly to release the jaw members thereby releasing the cart from the bracket, said pivotal retaining member being weighted at the trailing end thereof to urge it to a position engaging the exterior of the jaw members, and cooperating surfaces on the upper edge of the jaw members and on the lower edge of the pivotal retaining member for camming the jaw members inwardly to a closed position when the weighted pivotal retaining member exerts downward pressure thereon.

References Cited

UNITED STATES PATENTS 3,043,236    7/1962    Sgriccia _____ 104—172

DONALD A. GRIFFIN, Primary Examiner